United States Patent

[11] 3,587,218

| | | | |
|---|---|---|---|
| [72] | Inventor | William Richard Clifford Geary | |
| | | Flat 4, 18 Kensington Road, | |
| | | South Yarra, Victoria, Australia | |
| [21] | Appl. No. | 769,192 | |
| [22] | Filed | Oct. 21, 1968 | |
| [45] | Patented | June 28, 1971 | |
| [32] | Priority | Dec. 11, 1967 | |
| [33] | | Australia | |
| [31] | | 31,006 | |

[54] ROLL FORMING FODDER HARVESTERS
10 Claims, 8 Drawing Figs.

[52] U.S. Cl. ................................................. 56/343,
56/1, 56/27, 214/147
[51] Int. Cl. ................................................. A01d 39/00
[50] Field of Search........................................... 56/341-
—364, 1, 27; 214/147

[56] References Cited
UNITED STATES PATENTS

| | | | |
|---|---|---|---|
| 1,213,284 | 1/1917 | Slathar | 56/1 |
| 2,597,962 | 5/1952 | Whitley | 56/1 |
| 2,693,285 | 11/1954 | Buschbom | 214/147X |
| 2,975,918 | 3/1961 | Sharp | 214/147 |
| 2,979,216 | 4/1961 | Edwards | 214/147 |
| 3,006,489 | 10/1961 | Ealet | 214/147 |
| 3,110,145 | 11/1963 | Avery | 56/1 |
| 3,110,477 | 11/1963 | Campbell | 214/147X |
| 3,241,695 | 3/1966 | Bishop | 214/147 |
| 3,421,643 | 1/1969 | Barbee | 214/147 |

*Primary Examiner*—Russell R. Kinsey
*Attorney*—Young and Thompson

ABSTRACT: A roll-forming fodder harvester adapted to roll up a windrow of mown fodder material as it lies on the ground thereby to form a roll which rolls along the ground as the harvester moves along the windrow. The harvester includes rotatable windrow winding means which extend transversely above the windrow, and means for progressively laying a plurality of laterally spaced flexible members longitudinally beneath the windrow in advance of the winding means. These flexible members are connected to the winding means at the commencement of the roll-forming operation to ensure that the windrow is progressively picked up and wound about said winding means as the harvester moves forwardly. The said rotatable winding means are preferably mounted on the free rear ends of a laterally spaced pair of longitudinally extending arms which have their forward ends pivotally connected to a supporting frame so as to enable these arms to swing upwardly and downwardly in unison and also to swing inwardly towards and outwardly from each other. Thus, when the formation of a fodder roll is completed, the arms may be moved outwardly to withdraw the winding means therefrom.

INVENTOR.
WILLIAM RICHARD CLIFFORD GEARY
By Young & Thompson
ATTYS.

INVENTOR
WILLIAM RICHARD CLIFFORD GEARY
By Young + Thompson
ATTYS.

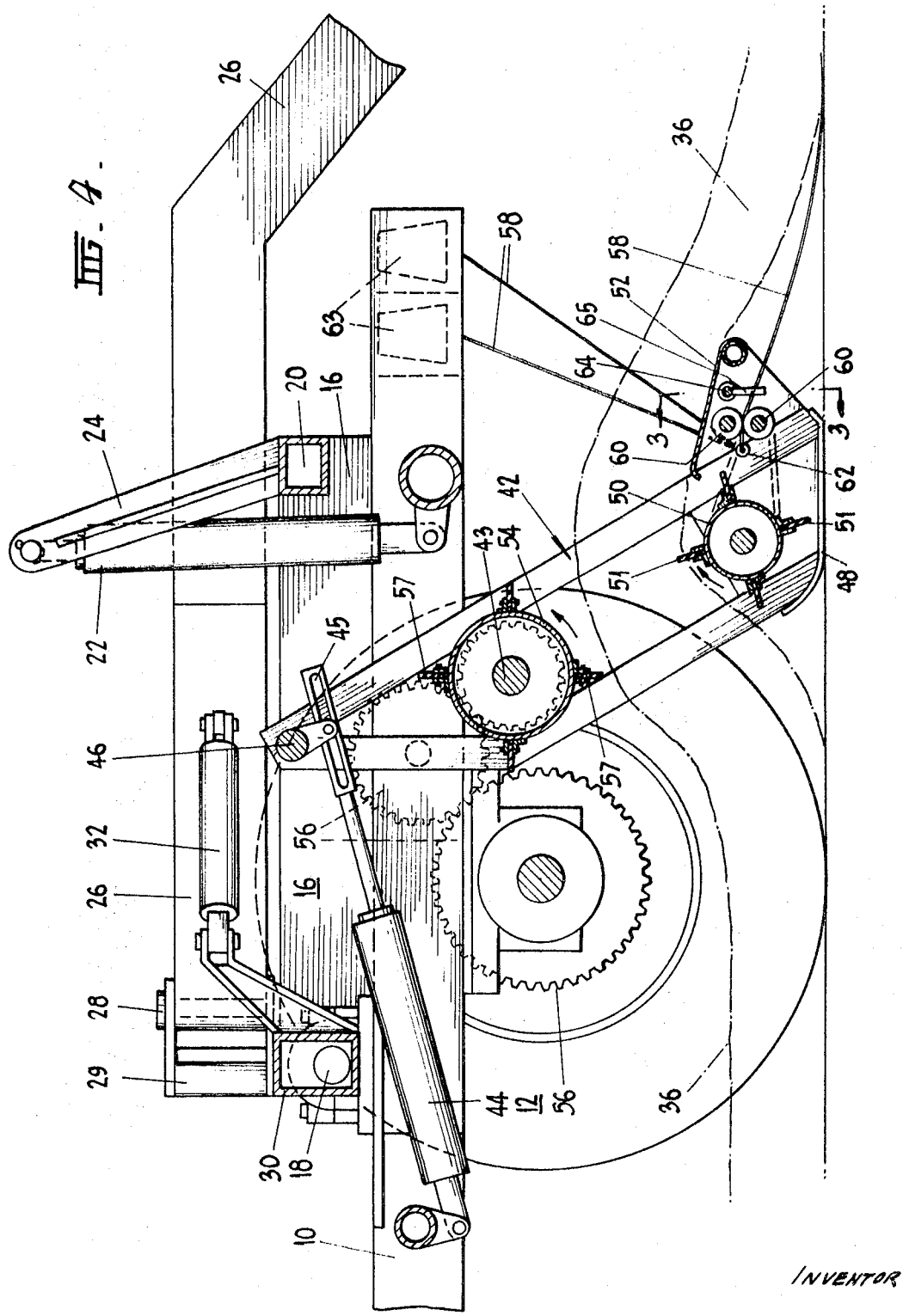

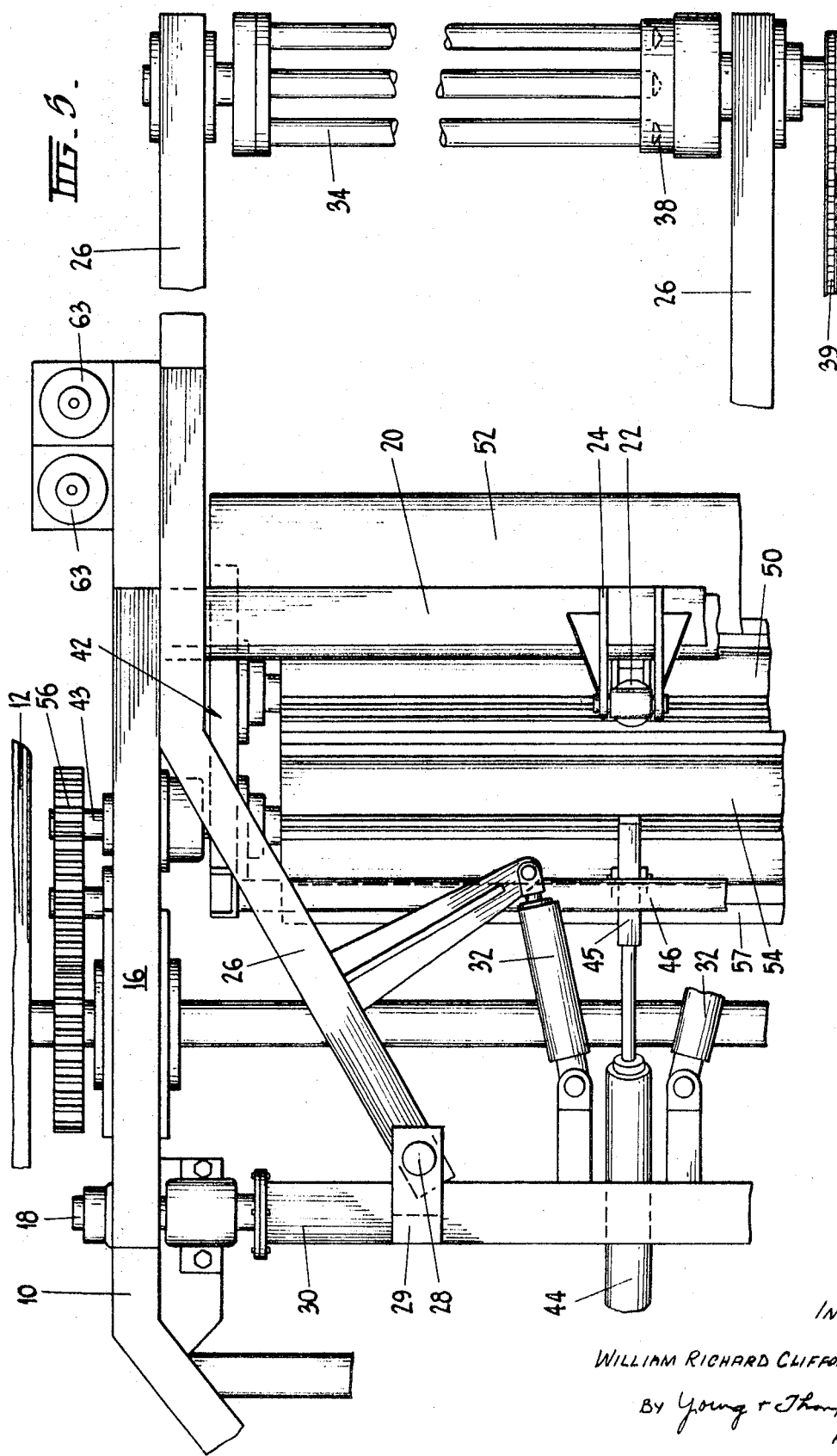

ROLL FORMING FODDER HARVESTERS

This invention relates to improved roll-forming fodder harvesters and is concerned more particularly with apparatus for use in the harvesting of pasture or similar fodder crops which have previously been mown and left in the field in the form of swathes or windrows, hereinafter both comprehended by the term windrows.

At present, pasture hay or the like is commonly harvested by means of machines which produce compact rectangular or cylindrical hay bales weighing approximately 60 lbs., though more recently a machine known as a fodder roller has been devised and used to gather the hay or the like and form it into a large heavy loose roll. Such a roll however disintegrates easily and is therefore difficult to handle and consequently such rolls are not readily adapted to be picked up and conveyed for storage in a shed or stack. Consequently such rolls are usually left on the ground, where they are produced, until subsequently they are fed to stock at that location, with the result that substantial wastage occurs through weathering and through stock trampling at the feeding stage.

The general object of this invention is to provide a roll-forming fodder harvester provided with transversely disposed rotatable winding means adapted to roll up a windrow of mown fodder material as it lies on the ground thereby to form a roll which rolls along the ground as the harvester moves along the windrow, the said windrow winding means being movable upwardly as the roll increases in diameter.

Another object of the invention is to provide a roll forming fodder harvester having transversely extending windrow winding means adapted to roll up a windrow as it lies on the ground and including means for laying a plurality of laterally spaced flexible members longitudinally beneath the windrow in advance of the winding means whereby said flexible members are attachable to the winding means to ensure that the windrow is picked up and wound therearound.

It is a further object of the invention to provide such a harvester with transversely extending windrow lifting means arranged in advance of the winding means and adapted progressively to raise the windrow so that it passes thereover and then drops back to the ground and wherein the said flexible members are laid below the thus successively raised portions of the windrow.

Still another object is to provide the harvester with a laterally spaced pair of longitudinally extending arms which are pivotally supported near their forward ends so as to permit said arms to move upwardly and downwardly and also laterally towards and from each other and wherein the said rotatable winding means extend transversely between the free rear end portions of said arms and are mounted on one at least of them. Thus, when the formation of a fodder roll is complete, the said arms may be moved outwardly to withdraw said winding means therefrom.

In order that the invention may be more clearly understood preferred forms of harvesters in accordance therewith are more fully described below with reference to the accompanying drawings in which:

FIG. 4 is a view in sectional side elevation taken on the line 4—4 of FIG. 2 and as drawn to a larger scale;

FIG. 5 is a view in plan of the portion of the machine shown in FIG. 4 and also shows windrow winding means;

Figure 1:
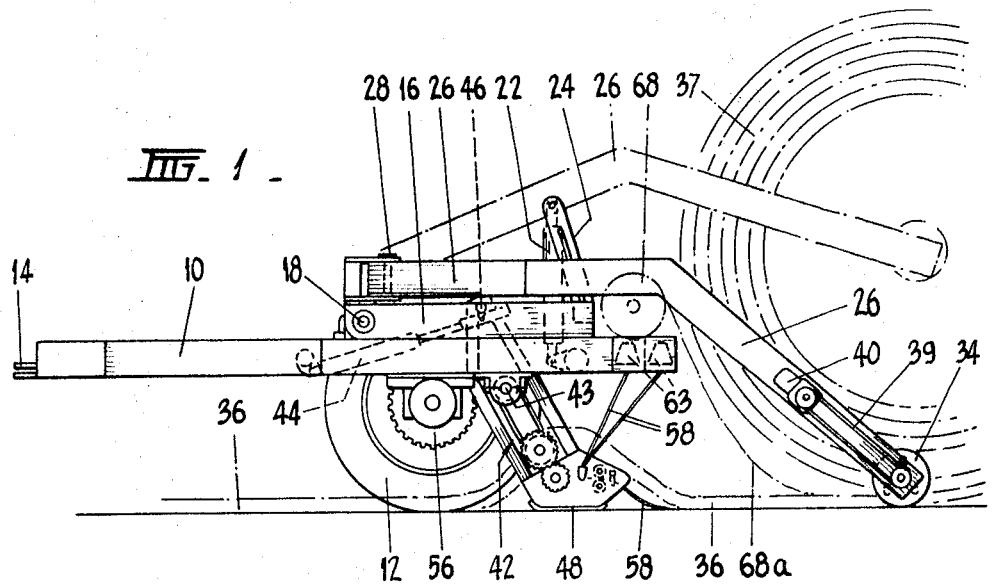
FIG. 1 is a view in side elevation of a fodder harvester according to the invention.

The machine shown in the drawings comprises a main frame 10 mounted on an opposed pair of transport wheels 12 and provided centrally at its forward end with a tractor hitch point 14.

Two laterally opposed and longitudinally extending lifting arms 16, each of which is disposed directly above a corresponding side beam of the main frame 10, have their forward ends pivotally connected to the opposite ends of a transverse spindle 18, mounted on the main frame, while the free rear ends of the said arms are connected together by a transverse beam 20 which has its upper surface flush with the upper surfaces of the said arms.

The lifting arms may be raised and lowered in unison by means of a hydraulic cylinder unit 22 which is pivotally connected at its upper end to a bracket 24 on the crossbeam 20 and at its lower end to the main frame as best shown in FIG. 4. When the lifting arms are fully lowered, as shown in the drawings, they lie horizontally on the upper surfaces of the respective side members of the main frame 10.

A laterally opposed pair of long main arms 26 have their rear portions normally disposed parallel to the longitudinal axis of the machine while their forward portions converge inwardly and are pivotally connected by corresponding approximately vertical pins 28 to brackets 29 secured in spaced relation to a sleeve 30 which is free to turn on the transverse spindle 18. Thus, the arms 26 are capable of being swung inwardly towards, and outwardly from, each other while also they are capable of being raised and lowered in unison by swinging them about the transverse spindle 18. For the last-mentioned purpose the said pivoted main arms 26 rest on the respective lifting arms 16 or on the crossbeam 20 connecting the free ends of the latter so that said arms 26 may be raised and lowered by raising and lowering the lifting arms by means of the hydraulic cylinder unit 22, it being understood that the lifting arms and said pivoted main arms both turn about the axis of the transverse spindle 18. As the pivoted arms 26 merely rest on the lifting arms 16 or on the crossbeam 20 they may be freely raised independently thereof during the roll-forming operation as hereinafter described.

For the purpose of swinging the arms 26 inwardly and outwardly about their respective vertical pivot pins 28, each of these arms is provided with an inwardly projecting bracket which is pivotally connected by a hydraulic cylinder unit 32 to an anchorage on the rotatable sleeve 30. Thus by means of suitable valve mechanism (not shown) these cylinder units may be actuated, either separately or in unison.

Figure 2:
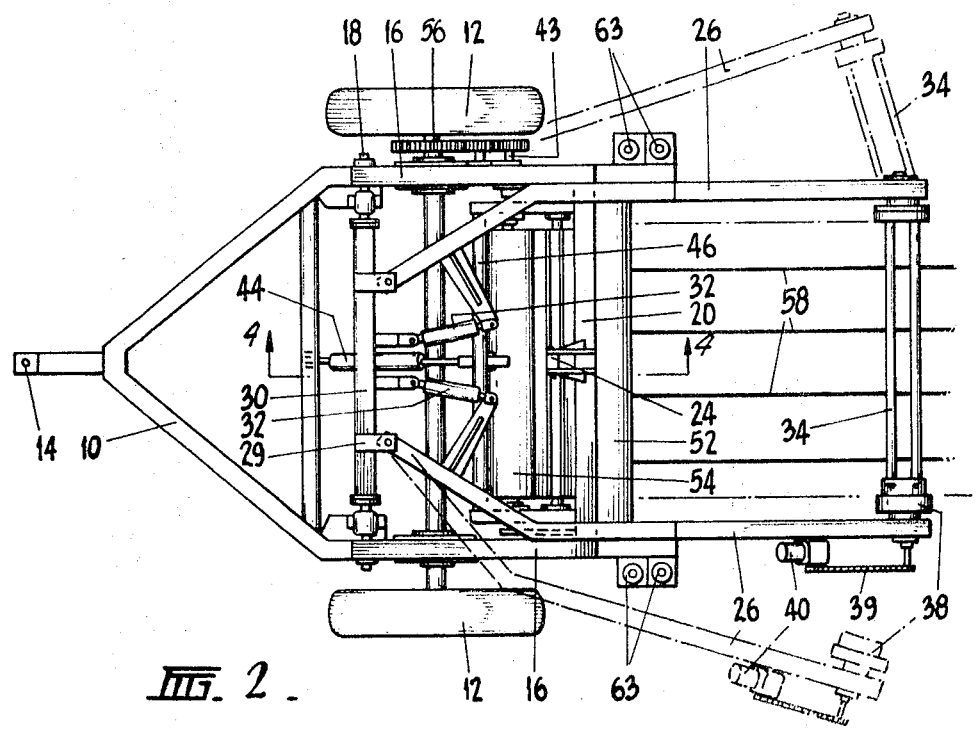
FIG. 2 is a view in plan of the machine shown in FIG. 1.

The free rear end of one of the main pivoted arms 26 freely rotatively supports a detachable inwardly projecting windrow winding device 34 which is disposed transversely when the machine is in use as shown in FIGS. 1 and 2. This windrow winding device is somewhat longer than the width of the windrow 36 and, as shown, it comprises three, or any other suitable member of spaced parallel rods or prongs, and in normal use, and again as shown in FIG. 2, the free ends of these rods are received within corresponding sockets in the inner face of a driving disc 38 rotatively mounted on the free end of the other arm 26 and disposed inwardly thereof. Any suitable means are provided for driving the disc 38 at a variable speed, such that the peripheral speed of a roll 37 of fodder formed from the windrow as hereinafter described, is approximately equal to the forward speed of the machine irrespective of the progressively increasing diameter of said roll. In the illustrated machine the disc 38 is driven through chain and sprocket gearing 39 by a variable speed hydraulic motor 40 mounted on the respective pivoted arms 26. The speed of this motor may be controlled by a regulating valve which is automatically adjusted as the arm 26 rises due to the increasing diameter of the roll. Thus, this valve may be controllable by a link (not shown) which connects it to the frame 10.

In order to wind the windrow tightly about the prongs 34, it is necessary or desirable during the initial stage of forming the roll to drive the latter positively, such as by the aforesaid means, and preferably at a speed such that the peripheral speed of the roll is slightly greater than the speed at which the machine moves along the windrow. It is found, however, that when the roll being formed, exceeds about three feet in diameter it is not practicable to transmit torque from the winding device 34 at the center to the periphery of the roll through the increasing mass of soft material. Thus from about this stage onwards the roll 37 is driven principally or solely by its frictional contact with the ground and the drive to the winding device 34 may be disconnected to permit such device to turn freely.

For this purpose a torque limiting clutch may be interposed between the hydraulic motor 40 and the chain and sprocket gearing 39.

Alternatively, the discs or hub 38 may be actuated during the initial stage of forming each roll, by a ground driven spoked wheel (not shown) and a torque limiting clutch, the said spoked wheel being preferably mounted on an arm which is pivoted to the respective main arm 26 so that said spoked wheel maintains contact with the ground until the roll is about three feet in diameter at which time the said spoked wheel is lifted clear of the ground by the arm 26, and the roll 37 is then driven solely by its frictional contact with the ground.

In order to attach the windrow 36 to the rotary gripping device 34, the arms 26 are lowered to their full extent as shown in FIG. 1, at which time the leading end of the windrow may be inserted between the spaced rods or prongs of said winding device. Alternatively the right hand arm 26, i.e. the upper arm in FIG. 2, may be swung outwardly to its full extent until the free ends of the said rods or prongs are clear of the adjacent side of the windrow. The said arm is then swung inwardly so that one or two of the prongs pass below the windrow while the remaining prong or prongs pass above it. Thus, when the prongs have been moved inwardly to their full extent so that their free ends have engaged the driving disc 38, the windrow is wrapped around the winding device 34 when the machine is subsequently moved forwardly and the disc 38 is rotated by its driving motor 40 or other driving means.

A subframe 42 is pivotally mounted on and depends from a transverse spindle 43 mounted in bearings, secured to the underside of the longitudinal side members of the main frame 10. This subframe comprises spaced side arms connected by suitable crossmembers and the upper portions of the side arms project upwardly above the pivot spindle and a hydraulic cylinder unit 44 which has its forward end pivoted to the main frame 10, has a lost motion connection 45 between its rear end and a crossmember 46 which connects the upward extensions of said side arms of the subframe 42 as shown in FIG. 4.

The lower end of each side arm of the subframe 42 is fitted with a skid 48 which rests on the ground during the harvesting operation and which due to the said lost motion connection are free to follow the ground contours. However, by means of the hydraulic unit 44, the subframe may be swung rearwardly and upwardly whereby it is raised clear of the ground for transport.

The subframe 42 rotatively supports the opposite ends of a windrow pickup roller 50 which extends transversely below the frame 10 and which is normally disposed close to the ground as shown best in FIG. 4. The length of this roller approximates the width of the windrow 36 and it is preferably provided with projecting prongs or longitudinally and radially extending rubber strips 51 or the like to engage and lift the windrow when it is rotated in the direction of the arrow shown adjacent thereto in FIG. 4. This roller 50 is driven at a peripheral speed which is approximately equal to the forward speed of the machine, so that the windrow is progressively raised by the roller 50 to pass above the latter after which it is again deposited on the ground as shown in the FIGURE.

A guide plate and shield 52, which also is mounted on the subframe, supports and guides the windrow as it passes rearwardly from the top of the roller 50.

A second transversely extending roller 54 is secured to the spindle 43 on which the subframe is pivoted, so that this roller is disposed above and forwardly of the pickup roller 50, whereby the windrow passes rearwardly through the gap between them. The roller 54 is driven at the required speed and in the same direction as the transport wheels 12 by toothed gearing 56 from the live axle of the latter, and said roller 54 is also provided with projecting prongs flexible flaps 57 or the like.

The pickup roller 50 is driven from the spindle 43 by suitable means, e.g., a crossed belt drive (not shown) whereby the roller 50 rotates at the required speed and in the opposite direction to the upper roller 54.

The machine is also provided with means for progressively paying-out and laying on the ground and longitudinally below the raised windrow 36, four laterally spaced lengths of twine 58, though it is to be understood that one, two, three or more than four such lengths may be laid and that any other suitable flexible material may be used in place of twine. For this purpose a superposed pair of rubber or other resilient feed rollers 60 is provided for each length of twine 58. These rollers 60 are arranged below the shield 52 and are driven at a peripheral speed which is equal to the forward speed of the machine. The spaced lower rollers 60 are secured to a common transverse spindle rotatively supported on the subframe 42 while each upper roller 60 is preferably independently movably supported and maintained in contact with the coacting lower roller by means of an individual spring.

Each length of twine 58 is directed rearwardly to the "bite" of the respective pair of feed rollers 60 by a rearwardly projecting outlet from a separate or a common feed tube 62 or by means of guide eyelets or the like arranged behind and close to the pickup roller 50 and in front of said feed rollers 60.

Two reels 63 of twine are rotatively mounted either on the frame 10 or on the side members of the subframe 42, at each side of the machine and the twine is led from each of them to the corresponding pairs of feed rollers 60 as previously described.

Figure 3:
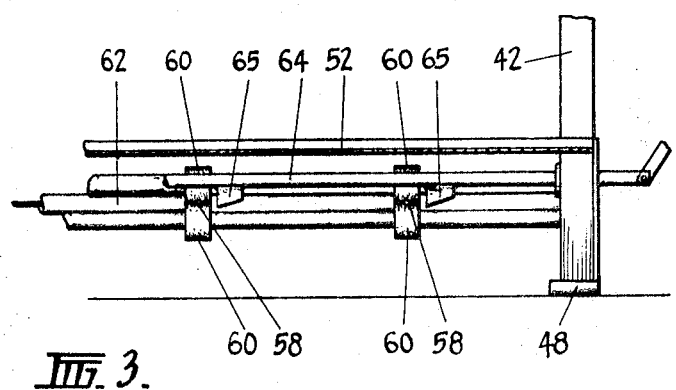
FIG. 3 is a detail view in sectional rear elevation taken on the line 3—3 of FIG. 4.

Any suitable means are arranged behind and adjacent to each pair of twine feed rollers 60 so that each length of twine 58 may be severed when the formation of each pasture roll 37 is completed. For example, and as best shown in FIG. 3, a transverse spindle 64 slidable mounted on the subframe, and operable either automatically or manually by means (not shown), is provided with a plurality of depending cutter blades 65 which are normally disposed close to one side of the respective length of twine immediately behind the feed rollers 60.

If desired a transverse pressing roller (not shown) may be provided in a position such that it normally rests on and rolls over the windrow 36 after the latter has been redeposited on the ground behind the pickup roller 50 and in advance of the fodder roll 37. This roller may be rotatively mounted on the free ends of pivoted tow links arranged one at each end of the roller while also the ends of the roller spindle may be connected by pivoted lifting links to the respective lifting arms 16. It has been generally found however that such a pressing roller is unnecessary as the windrow is sufficiently compacted by the fodder roll 37.

A roll 68 of polythene or other suitable flexible protective sheet material 68a is preferably mounted transversely and removably on top of the rear end of the machine frame 10 and between the main arms 26. The width of this sheet material is preferably approximately equal to, and may be somewhat larger than, the width of the windrow 36 and the pasture roll 37 formed therefrom, and means (not shown) are provided whereby the said roll of protective sheet material may be rotated when the formation of a pasture roll 37 is nearing completion, in order to cause the said protective sheet to be fed downwardly in front of the fodder roll as indicated in FIG. 1. Preferably the operation of feeding the protective sheet material commences at a time such that this material is interleaved between the second last and outermost convolutions of the fodder roll, and is then continued so as to form a second layer which forms an outer wrapping about the completed roll. As previously mentioned, this sheet material prevents or reduces moisture penetration, if the roll when completed is to be stored in the field until required for use.

In operation, the machine towed by a tractor the wheels of which, similarly to the transport wheels 12 of the said machine, are arranged to straddle the windrow 36, is moved up close to an end of the latter. The subframe 42, which up to this time has been raised, and preferably locked, in its raised position, is then unlocked and lowered until the skids 48 rest on the ground.

The machine is then moved forwardly over the windrow so that it is lifted by the pickup roller 50 and the several lengths of twine are laid beneath it. The machine is stopped after it has travelled a sufficient distance, which may be about 8 feet, so that the end portion of the windrow is then below the free rear ends of the main pivoted arms 26 which are still in the raised transport position.

That main arm 26 which rotatively supports the windrow winding device 34 is then moved outwardly to its full extent and both arms 26 are then lowered until the rotatable discs thereon rest on the ground. At this time the free inner ends of the prongs of the winding member are clear of the respective side of the windrow.

The respective arm 26 is then swung inwardly so that one or two of the prongs pass below the windrow and the twine, and so that at least one prong passes above it. When the prongs have moved inwardly to the full extent their free ends engage the coacting sockets in the driving disc 38. This operation of attaching the end of the windrow and the twine lengths to the winding device may be manually assisted if necessary.

The machine is then again driven forwardly so that the rolling of the windrow 36 into a roll 37 commences and this operation may be continued until a roll containing up to 1,000 lbs. weight or more of pasture is formed. Such a roll may be some 8 feet in diameter and the pivoted arms 26 are progressively raised by the roll as it increases in diameter as shown in broken lines in FIG. 1.

When a roll of the required size has been formed and preferably while the machine is still moving forwardly, the windrow winding device 34 is progressively withdrawn from the center of the roll and the several lengths of twine 58 are cut, by manual or automatic operation of the slidable cutter bar 64.

If, however, the roll 37 is to be wrapped with protective sheet material 68a, the roll 68 thereof is operated before the formation of the roll is completed, so that the end of the strip 68a is interleaved beneath the outermost convolution of the roll and this operation is continued so that the strip forms an outer wrapping on the roll.

The formed roll 37 is thus left on the ground behind the machine which may proceed similarly with the formation of a further roll.

It will be apparent that the twine 58 assists in the operation of forming the loose windrow into a roll and that it binds the latter so that it may later be handled for transport and storage.

Figure 6:
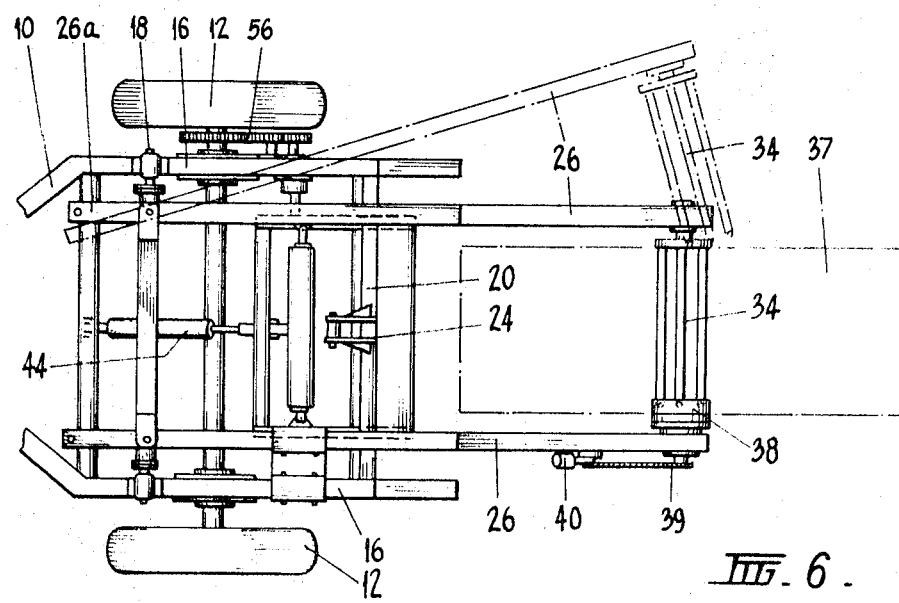
FIG. 6 is a view in plan showing a stage in the use, as a harvester, of a somewhat modified construction of the machine.
Figure 7:
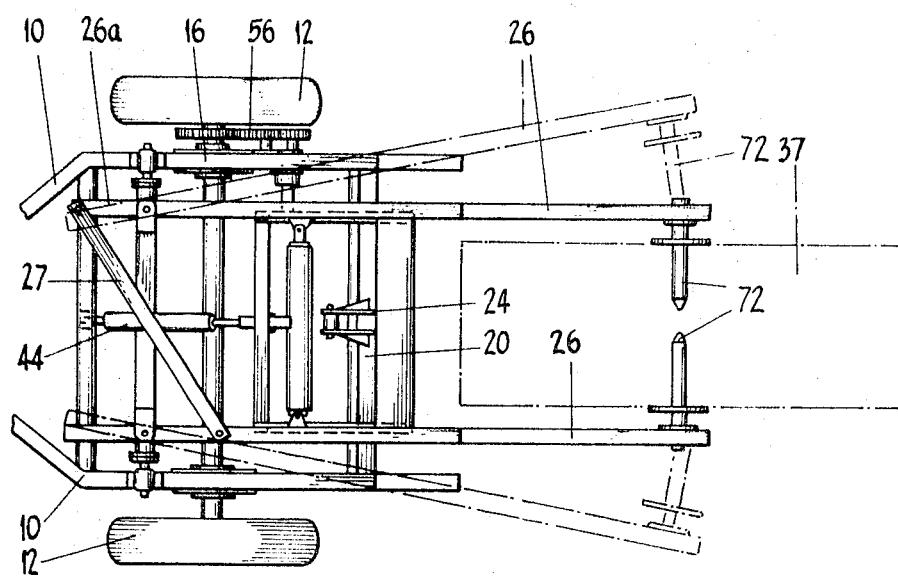
FIG. 7 is a view similar to FIG. 6 and shows the machine as modified for the transport or unrolling of a fodder roll.

FIGS. 6 and 7 show a somewhat modified and preferred construction of the machine in which only that pivoted arm 26, which carries the rotatable windrow winding device 34 is directly operated for lateral swinging movements, e.g. by a hydraulic cylinder unit such as 32 in FIG. 2. A forward extension 26a of this arm is adapted to be connected by a pivoted link 27 to the other main arm 26, rearwardly of the pivot thereof. Thus, when this link 27 is attached the two arms 26 are constrained to swing inwardly and outwardly in unison while, when it is disconnected, only that arm which carries the windrow winding device 34 is actuated and the other arm 26 may then be temporarily locked by a bracket to the adjacent lifting arm 16.

The attachment of the windrow winding device 34 to one only of the arms 26, as shown in FIGS. 1, 2 and 6, provides the advantage that said device may be driven from means mounted on the other arm 26 which is not required to swing laterally and this facilitates the construction and control of the means for driving said member 34 at a variable speed.

However, in lieu of using a single windrow winding member 34 of a length which exceeds the width of the windrow as above described, two shorter pronged members may be rotatively mounted, one on the free end of each arm 26, such shorter members being coaxially opposed during the roll forming operation. In such circumstances however, it is necessary to drive each of said shorter windrow winding members independently at the required variable speed. In either case the prongs of the windrow winding member or members may be collapsible inwardly to facilitate its or their removal from the center of the roll 37.

A machine as shown in FIGS. 1 and 2 or 6 may also be used for subsequently picking up, and transporting from the field, the rolls 37 formed in the aforesaid manner. For this purpose however, the windrow winding device 34 is preferably detached from the respective main arm 26 and replaced by a pointed stub 72 as shown in FIG. 7 and a similar stub 72 is attached to the disc 38 on the other arm 26.

In order therefore to pick up a roll 37, both of the arms 26 are swung outwardly until the distance between the free inner ends of the stubs 72 exceeds the width of the roll. The machine is then backed up to the roll and the arms are moved inwardly to insert the stubs 72 into the opposite ends of the center thereof. The arms 26 are then raised to lift the roll clear of the ground and enable it to be carried to the required location.

Figure 8:
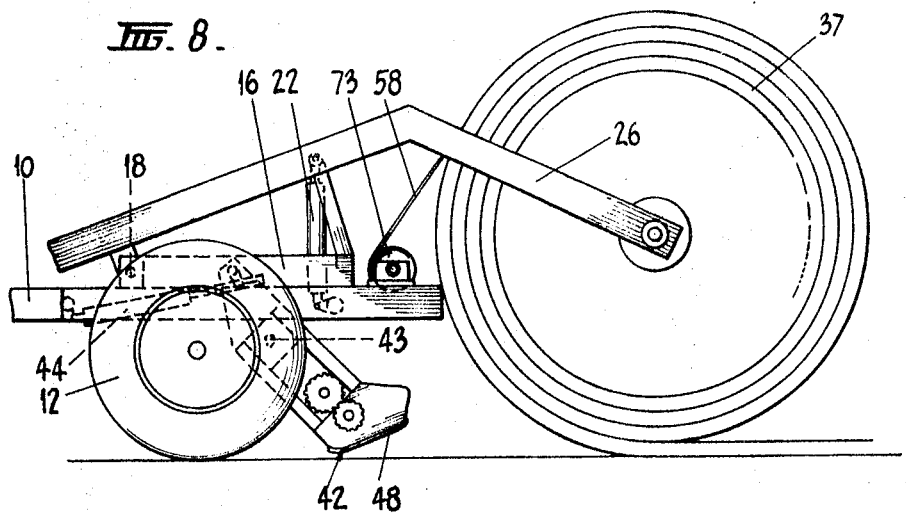
FIG. 8 is a view in side elevation of the modified machine shown in FIG. 7 during the unrolling operation.

When it is desired to feed the fodder to stock, the roll may be similarly picked up and carried to the required location where it is deposited on the ground. The machine is then driven forwardly as shown in FIG. 8 so that the windrow is unrolled and laid on the ground and during this operation the twine 58 is preferably rewound on spools 73 for subsequent reuse. Then spools 73 may be detachably mounted on the rear end of the main frame 10 in place of the detachable roll 68 of wrapping material shown in FIG. 1.

It is to be understood that the machine described above and shown in the drawings may be used for harvesting a variety of different fodder crops.

I claim:

1. A roll-forming fodder harvester comprising frame means adapted to be supported at a suitable height on transport wheels so as to be movable longitudinally above a windrow of mown fodder material, means supported by said frame means for progressively laying a plurality of laterally spaced flexible members longitudinally beneath the windrow, rotatable windrow winding means arranged rearwardly of said last-mentioned means and transversely with respect to the windrow, such winding means being adapted for the attachment thereto of said flexible members, means operable to rotate said winding means, and means connecting said winding means to said frame means in a manner which enables said winding means to move upwardly from and downwardly to a position close to the ground, whereby when said flexible members are attached to said winding means and the harvester is moved along the windrow, the latter together with said flexible members is progressively wound around said winding means to form a roll which rolls along the ground and said winding means progressively rise as the diameter of the roll increases.

2. A roll-forming fodder harvester according to claim 1 wherein said connecting means comprises, a laterally spaced pair of longitudinally extending arms, and including means pivotally connecting the forward end portion of each arm to said frame means whereby said arms may swing upwardly and downwardly in unison and whereby at least one of said arms may also be swung laterally inwardly towards and outwardly from the other arm, and means operable to swing said one arm laterally, and wherein said rotatable winding means extend between the free rear ends of said arms and are rotatably supported on one at least of them.

3. A roll-forming fodder harvester according to claim 1 wherein said connecting means comprises, a laterally spaced pair of longitudinally extending arms, and including means pivotally connecting the forward end portion of each arm to said frame means whereby said arms may swing upwardly and downwardly and also laterally towards and from each other, and means operable to swing said arms laterally towards and from each other in unison and wherein said rotatable winding means comprises two rotatable winding members and each such winding member is mounted on the free rear end portion of a corresponding one of said pivoted arms and projects inwardly therefrom, said winding members being disposed substantially in coaxial alignment during the roll-forming operation.

4. A roll-forming fodder harvester according to claim 1 including transversely extending windrow lifting means supported by said frame means in advance of said winding means, said lifting means being adapted progressively to raise the windrow from the ground so that it passes rearwardly thereover and then drops back to the ground, and wherein said means for progressively laying said flexible members below the windrow are arranged to lay the same below the thus successively raised portions of the windrow.

5. A roll-forming fodder harvester according to claim 3 including a transversely extending windrow pickup member supported by said frame means and arranged close to the ground and means operable to rotate said pickup member at a peripheral speed which is approximately equal to the speed at which the harvester moves along the windrow and in the direction such that its forward peripheral portion moves upwardly, whereby said member progressively raises the windrow so that it passes rearwardly thereover and then drops back to the ground, and wherein said means for progressively laying said flexible members below the windrow are arranged to lay the same below the thus successively raised portions of the windrow.

6. A roll-forming fodder harvester according to claim 5 including a subframe depending from and pivotally connected near its upper end to said frame means about a transverse axis, and wherein said pickup member is rotatively mounted on the lower end portion of said subframe whereby said member may swing rearwardly and upwardly if it encounters an obstruction.

7. A roll-forming fodder harvester according to claim 2, including means mounted on said frame means for rotatably supporting a transversely disposed roll of flexible wrapping material above the windrow and in advance of said windrow winding means, whereby said wrapping material may be paid out above the windrow as it lies on the ground whereby said material may be interleaved between outer convolutions of the fodder roll and wrapped about the exterior thereof.

8. A roll-forming fodder harvester comprising a frame, transport wheels supporting the frame whereby it is movable longitudinally above a windrow of mown fodder material, a laterally opposed pair of longitudinally extending arms, means pivotally connecting forward portions of said arms to the frame whereby they may swing upwardly and downwardly and also laterally towards and from each other, a windrow winding member individual to each arm, each winding member being rotatively mounted on and projecting inwardly from the free rear end portion of the respective arm, and said winding members being disposed substantially in coaxial alignment during the roll-forming operation, means operable to rotate said winding members so as to wind the windrow thereabout and said winding members being disposed close to the ground when the arms are in their lowermost positions, transversely extending rotatable windrow lifting means arranged in advance of said winding members so as to pass below and progressively raise the windrow as the harvester moves therealong, whereby the windrow passes thereover and then drops back on the ground, means operable to direct a plurality of laterally spaced flexible members below the thus successively raised portions of the windrow whereby said flexible members are laid longitudinally therebelow, and wherein said winding members are adapted for the attachment thereto of the said flexible members whereby as the harvester is subsequently moved along the windrow, the latter together with said flexible members is progressively wound about the winding members to form a roll which rolls along the ground and which progressively raises the said arms as its diameter increases, and means operable to swing said arms laterally towards and from each other whereby when the formation of the roll is complete, the winding members may be withdrawn therefrom by moving said arms outwardly.

9. A roll-forming fodder harvester according to claim 8 including means operable to raise and lower said longitudinally extending arms.

10. A roll-forming fodder harvester comprising a frame supported on transport wheels whereby it is movable longitudinally above a windrow of mown fodder material, two laterally spaced and longitudinally extending arms pivotally connected near their forward ends to the frame so as to turn about a substantially transverse axis, rotatable windrow winding means mounted on the rear end portion of at least one of said pivoted arms and extending transversely between them, said rotatable winding means being adapted for the attachment of the windrow thereto, whereby as the harvester moves along the windrow, the latter is progressively wound around said winding means to form a roll which rolls along the ground and which progressively raises said arms as its diameter increases, means operable to raise and lower said arms in unison about said transverse axis, further pivot means near the forward end of each arm to enable said arm to swing laterally so that its rearward end moves substantially transversely of the harvester, and means operable to swing said arms about said pivot means.